United States Patent
Singh

(10) Patent No.: US 11,989,805 B2
(45) Date of Patent: May 21, 2024

(54) DYNAMIC GEOMETRY USING VIRTUAL SPLINE FOR MAKING MAPS

(71) Applicant: HERE Global B.V., Eindhoven (NL)

(72) Inventor: Rakesh Singh, Mumbai (IN)

(73) Assignee: HERE Global B.V., Eindhoven (NL)

( * ) Notice: Subject to any disclaimer, the term of this patent is extended or adjusted under 35 U.S.C. 154(b) by 264 days.

(21) Appl. No.: 17/525,561

(22) Filed: Nov. 12, 2021

(65) Prior Publication Data
US 2023/0154073 A1     May 18, 2023

(51) Int. Cl.
| | |
|---|---|
| G06T 11/20 | (2006.01) |
| G01C 21/00 | (2006.01) |
| G01C 21/36 | (2006.01) |
| G06F 16/29 | (2019.01) |
| G06T 3/40 | (2006.01) |

(52) U.S. Cl.
CPC ........ *G06T 11/203* (2013.01); *G01C 21/3602* (2013.01); *G01C 21/3667* (2013.01); *G01C 21/3819* (2020.08); *G06F 16/29* (2019.01); *G06T 3/40* (2013.01)

(58) Field of Classification Search
CPC ............ G01C 21/3667; G01C 21/3602; G01C 21/3819; G01C 21/367; G06T 3/40; G06T 11/203; G06F 16/29
See application file for complete search history.

(56) References Cited

U.S. PATENT DOCUMENTS

| | | | | |
|---|---|---|---|---|
| 6,366,927 | B1* | 4/2002 | Meek | G01C 21/3819 |
| | | | | 707/999.102 |
| 7,084,882 | B1* | 8/2006 | Dorum | G01C 21/3867 |
| | | | | 345/592 |
| 11,041,736 | B2 | 6/2021 | Sakr et al. | |
| 11,087,147 | B2 | 8/2021 | Sithiravel et al. | |
| 2013/0328937 | A1* | 12/2013 | Pirwani | G01C 21/3815 |
| | | | | 345/660 |
| 2016/0341562 | A1* | 11/2016 | Samsonov | G01C 21/3815 |
| 2016/0356609 | A1* | 12/2016 | Dorum | G01C 21/34 |
| 2019/0108663 | A1* | 4/2019 | Batra | G06T 11/203 |
| 2020/0240794 | A1 | 7/2020 | Prasser et al. | |
| 2020/0248545 | A1* | 8/2020 | Maus | E21B 47/022 |
| 2022/0282994 | A1* | 9/2022 | Goldman | B60W 30/143 |

FOREIGN PATENT DOCUMENTS

| | | |
|---|---|---|
| CN | 110046320 A | 7/2019 |
| WO | 2021138616 A1 | 7/2021 |

OTHER PUBLICATIONS

Hasberg, Carsten, and Stefan Hensel. "Online-Estimation of Road Map Elements using Spline Curves." 2008 11th International Conference on Information Fusion. IEEE, 2008. (pp. 1-7).

* cited by examiner

*Primary Examiner* — Phi Hoang
(74) *Attorney, Agent, or Firm* — Lempia Summerfield Katz LLC

(57) ABSTRACT

System and methods are disclosed for providing efficient rendering of map data. Instead of providing a set of points that describe a geographic feature, e.g., systems and methods provide spline functions that allow a device to generate smooth and accurate overlays of the geographic feature on the fly without additional information, for example, when changing a zoom or scale level.

18 Claims, 14 Drawing Sheets

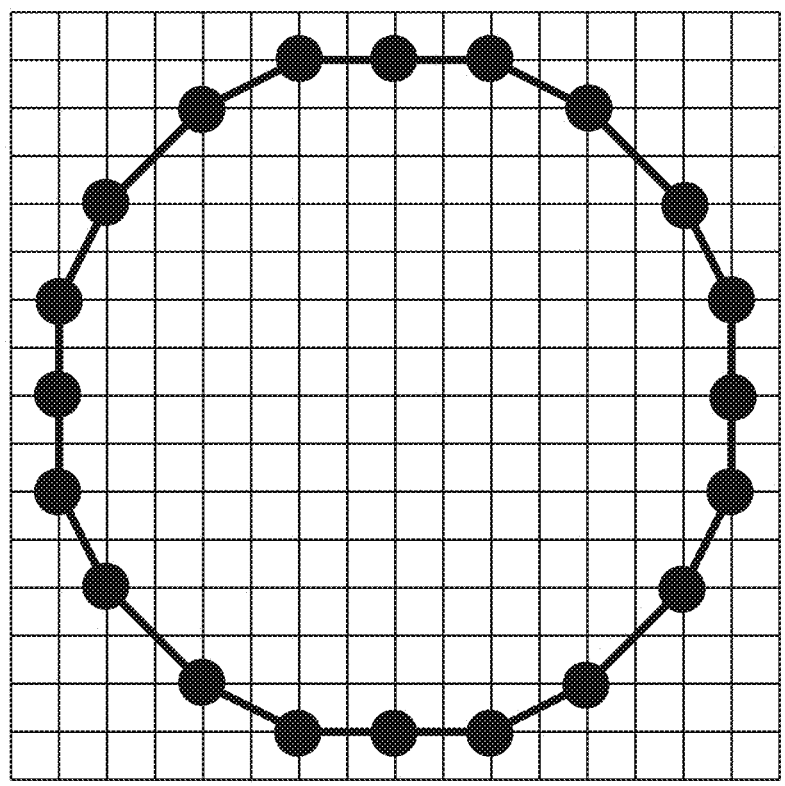
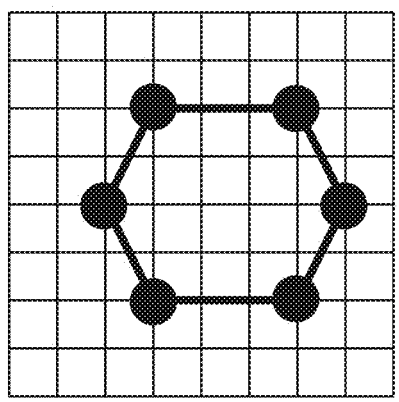

DYNAMIC GEOMETRY USING VIRTUAL SPLINE FOR MAKING MAPS

FIELD

The following disclosure relates to navigation devices or services.

BACKGROUND

In mapping applications, layers form one of the primary mechanisms to display information to users. Within each layer, symbols, colors, and text are used to portray important information that describes each of the individual geographic elements. In order to display, for example, roads or a route to a user, a series of points are provided and connected in order to trace the road or route. Currently roads and other geographic features are represented by mapping applications using the standardized GeoJSON format.

GeoJSON is a format for encoding a variety of geographic data structures using JavaScript Object Notation (JSON). GeoJSON defines several types of JSON objects and the manner in which they are combined to represent data about geographic features, their properties, and their spatial extents. For example, a GeoJSON object may represent a region of space (a Geometry), a spatially bounded entity (a Feature), or a list of Features (a FeatureCollection). GeoJSON supports the following geometry types: Point, LineString, Polygon, MultiPoint, MultiLineString, MultiPolygon, and GeometryCollection. Features in GeoJSON contain a Geometry object and additional properties. A FeatureCollection contains a list of Features. Using these objects, the GeoJSON format may be used to represent geographic data in the broadest sense. Anything with qualities that are bounded in a geographical space may be represented.

GeoJSON thus provides an ability to identify and add information to an underlying map using coordinates and several different types of objects. A point, line, or polygon, for example may be described using GeoJSON. However, GeoJSON is limited in that the smoothness of a representation is directly proportional to a number of coordinates used and hence the storage space and network load increases when trying to provide a smooth and accurate depiction. For example, when attempting to draw a curve or arc, the smoothness (to a user's eye) increases in proportion to the number of geometries/coordinates included.

This becomes an issue as an essential feature of many web-based, interactive maps is panning and zooming, together referred to as map browsing. Zooming may be especially challenging using GeoJSON due to the differing number of coordinates required at different zoom levels to provide a smooth and accurate depiction. With a low zoom level, a depiction of a curved road may only require a few coordinates to convey the shape of the road to a user (for example, by connecting several points with lines). However, when the zoom attribute is increased, the road may require many more coordinates (increasing as the level of zoom increases) to provide a smooth and accurate depiction. This may put a strain on the ability of mapping services to provide quick and seamless viewing experiences.

SUMMARY

In an embodiment, a method is provided for a smooth map view, the method comprising: requesting, by a device, map data for a geographic feature; receiving, by the device from a mapping server, one or more spline identifiers and spline attributes related to the geographic feature; rendering, by the device, a first representation of the geographic feature from the one or more spline identifiers and spline attributes; and displaying, by the device, the first representation.

In an embodiment, a system is provided for a smooth map view. The system includes a geographic database and a navigation device. The geographic database is configured to store a spline function and spline attributes for each of a plurality of geographic features. The navigation device is configured to request data for a geographic feature of the plurality of geographic features from the geographic database and receive a respective spline object comprising at least a respective spline function identifier and respective one or more spline attributes. The navigation device is further configured to generate one or more geometries using a respective spline function that corresponds to the respective spline function identifier and the respective one or more spline attributes, render a first view of the geographic feature comprising the one or more geometries, and display the rendered first view on a display of the navigation device.

In an embodiment, an apparatus for is provided including at least one processor and at least one memory including computer program code for one or more programs. The at least one memory is configured to store the computer program code configured to, with the at least one processor, cause the at least one processor to: request map data for a geographic feature; receive, from a mapping server, a spline data object related to the geographic feature; rendering a first representation of the geographic feature using the spline data object; and displaying the first representation.

In an embodiment, a computer program product may also be provided. For example, a computer program product comprising instructions which, when the program is executed by a computer, cause the computer to carry out the steps described herein.

BRIEF DESCRIPTION OF THE DRAWINGS

Exemplary embodiments of the present invention are described herein with reference to the following drawings.

FIGS. 2A and 2B depict two circles.

DETAILED DESCRIPTION

Embodiments provide systems and methods for efficient rendering of map data. Instead of providing a set of points that describe a geographic feature, systems and methods provide spline functions that allow a device to generate smooth and accurate overlays on the fly without additional information even when changing a zoom or scale level.

Map information is typically displayed using one or more layers that include a feature and the location of the feature(s). These layers may be presented on their own or on top of, for example a classic view of the roadway, a satellite view, or a terrain-based view among other view. In order to add information such as routing, traffic, points of interest, or other geographic features, users or application typically provide data in a GeoJSON format. As described above GeoJSON is a way of representing geographic data. In an example, if a user wishes to show the location of several points of interest, the user can provide coordinates/geometries for each of the points of interest using a GeoJSON format that instructs the map to indicate a dot or pin for each of the points of interest. This example uses "points" for the geometry type, i.e., exact locations, but that's not the only type of data that can be represented in GeoJSON. A user may also provide a path or route between two or more points by using the GeoJSON format to draw a line(s) between the points. There are additional object types. As described in RFC 7946, GeoJSON includes the following different features: a geometry object (herein referred to as a geometry or geometries): this is either a point, line, or polygon described earlier, a feature object: this is the geometry object and the associated random ad hoc data, and a feature collection object which is basically a list of feature objects.

Figure 1A:
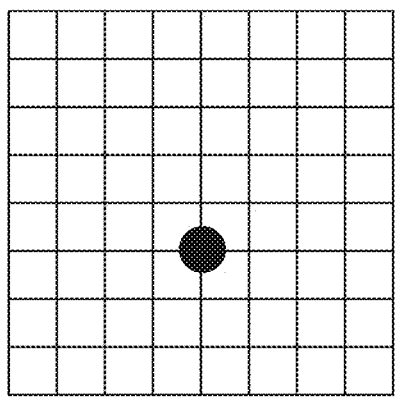
FIGS. 1A, 1B, and 1C depict several examples of GeoJSON objects.
Figure 1B:
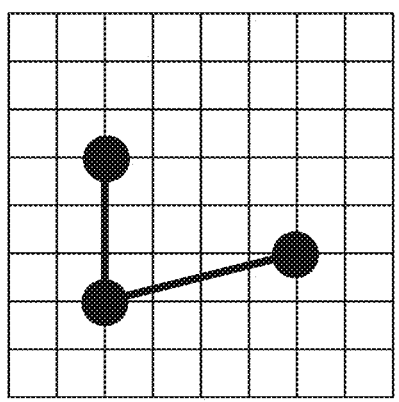
Figure 1C:
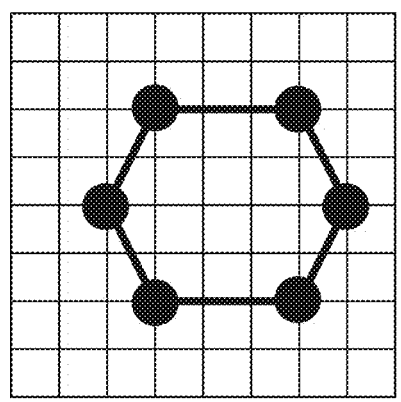

FIGS. 1A, 1B, and 1C depicts several examples of GeoJSON objects including a point, line, and polygon. In FIG. 1A, the point may be described using the notation: {"type": "Point", "coordinates": [3.0, 4.0]}. The coordinates may describe where on the grid the point should located, here x=3 and y=4. In FIG. 1B, a line may be described using two or more points. There is one line in FIG. 1B that connects three different points. The object notation may be: {"type": "linestring", "coordinates": [[3.0, 2.0], [2.0, 6.0], [5.0, 6.0]]}. The polygon in FIG. 1C may be described using the notation: {"type": "polygon", "coordinates": [[2.0, 2.0], [2.0, 5.0], [4.0, 6.0], [6.0, 5.0], [6.0, 2.0], [4.0, 1.0]]}. If a user or application attempts to show a circle with a specific radius, they user needs to provide a polygon with a large number of sides to approximate a circle as GeoJSON doesn't natively have a Circle type. For example, the polygon in FIG. 1C may approximate a rough circle.

One of the main limitations of GeoJSON it that generating perfect/Smooth Road representations is directly proportional to the number of coordinates/geometries (e.g., points, line, or polygons) used and hence the required storage space and network load increases as the representation responds to requested changes by a user, for example by zooming in or out. The mapping service/application is forced to provide additional geometries every time the scale or zoom level of the map changes. Representation of huge geometries may also be challenging using a browser given the amount of data that is required to provide a smooth view for certain roadway configurations.

FIGS. 2A and 2B depict an example of how a circle can be depicted at several zoom levels. The first depiction is similar to the polygon used above in FIG. 1C. In order to zoom in or increase the scale, the number of points/coordinates/geometries must be increased so to generate the second polygon so that it appears to be circular to a human eye. The increase in geometries goes from six (6) to twenty (20). The increase in geometries slows down the ability of a navigation application/device to provide zooming functions as each time the zoom attribute changes, the mapping system 121 is required to provide a different number of coordinates.

Embodiments provide systems and methods that provide functions (Splines) that can generate geometries on the fly instead of a collection of static geometries. Embodiments provide and store the functions and not the geometries. On the backend, a mapping system creates/generates spline functions that match the roadway network using data stored in a geographic database or HD map. Duplicate or similar road configurations/shapes may reuse spline functions that are stored in spline pools so to avoid the recalculation computation. The representations of the roadway may be stored in a Spline JSON format, for example, that includes at least a spline function identifier and spline attributes. Additional information may be included, for example a junction value and a confidence value. Other formats may be used that include at least a spline function identifier and spline attributes. When applied by a navigation device or navigation application, depending upon the smoothness of the road as per the zoom level, the geometries are created locally from the spline functions instead of having to be requested and provided. Using the spline functions, the local devices can create infinite geometries, and hence ideal Maps for display efficiently and quickly.

The following embodiments relate to several technological fields including but not limited to navigation, autonomous driving, assisted driving, traffic applications, and other location-based systems. In each of the technologies of navigation services, autonomous driving, assisted driving, traffic applications, and other location-based systems, improved representation and rendering of map data improves the ability of the mapping system to provide a safe and satisfactory trip. In addition, users of navigation, autonomous driving, assisted driving, traffic applications, and other location-based systems are more willing to adopt these systems given the technological advances in improved safety, visualization, and understanding of the roadway.

Figure 3:
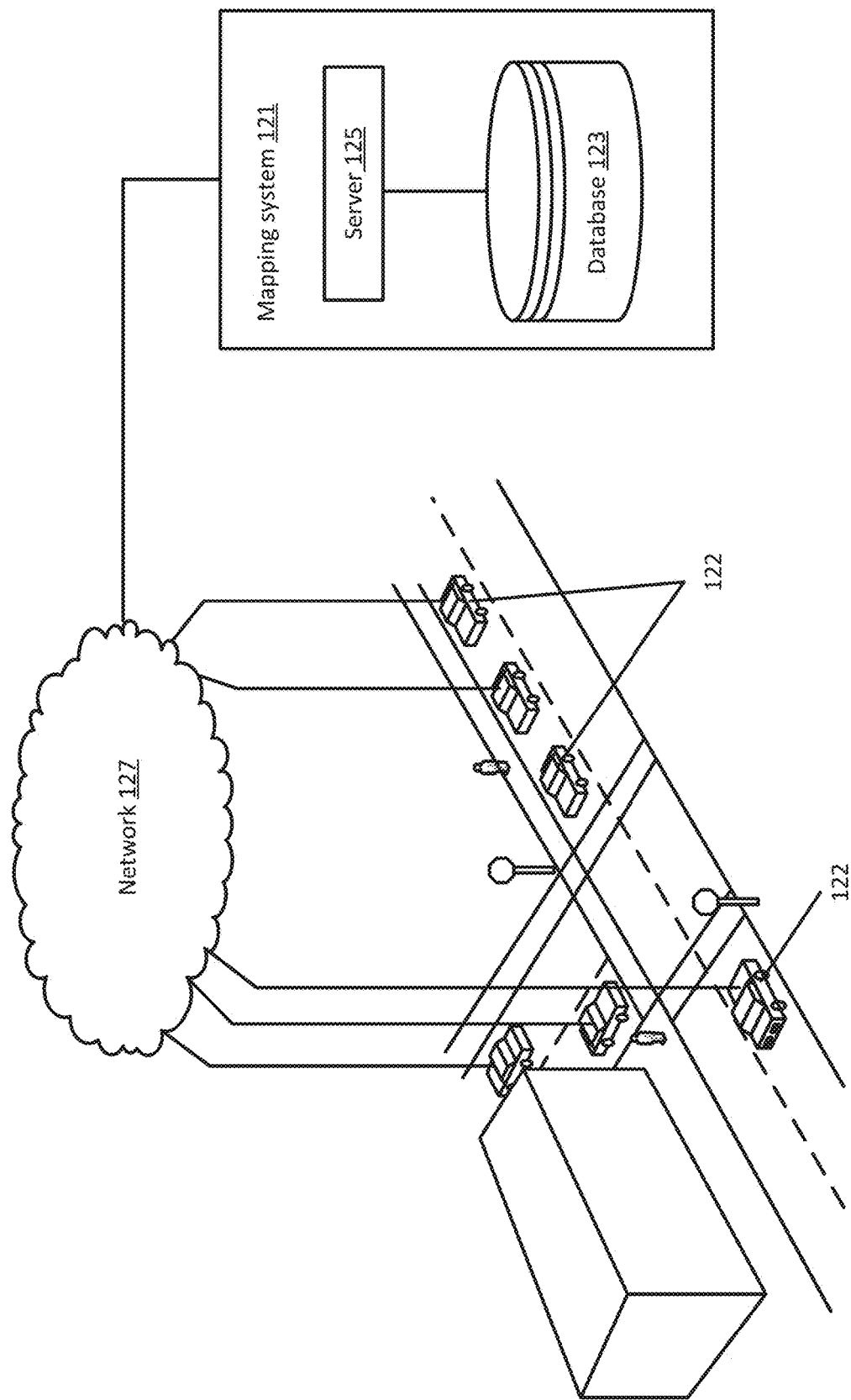
FIG. 3 depicts an example system for computing and applying a Spline JSON object according to an embodiment.

FIG. 3 depicts a system for computing and providing a spline function, for example included with a Spline JSON object, for use in displaying geographic features. The system includes at least one or more devices 122, a network 127, and a mapping system 121. The mapping system 121 may include a database 123 (also referred to as a geographic database 123 or map database) and a server 125. Additional, different, or fewer components may be included. The mapping system 121 is configured to identify/compute a spline function and attributes for each respective road/segment/configuration. In operation, a device 122 take a respective spline identifier and splines attributes as the input from the mapping system 121 and locally creates the geometry (roads) on the fly in order to provide a smooth and accurate representation. Each spline may include a confidence score, so that the values may be improved using feedback mechanisms. The spline definition may be taken from pools of splines. For junctions, a further attribute may be used in the splines where the tolerance of junction is subdivided with multiple spline definitions.

The one or more devices 122 may include probe devices 122, probe sensors, IoT (internet of things) devices 122, or other devices 122 such as personal navigation devices 122 or connected vehicles. The device 122 may be a mobile device or a tracking device that provides samples of data for the location of a person or vehicle. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices 122 may be configured as data sources that are configured to acquire sensor data and/or roadway feature data. These devices 122 may be remotely monitored and controlled. The devices 122 may be part of an environment in which each device 122 communicates with other related devices in the environment to automate tasks. The devices 122 may communicate sensor data to users, businesses, and, for example, the mapping system 121.

The one or more devices 122 are configured to provide geographical information to a user using a display. A device may receive input from a user (for example a request to view a map, route, or other geographical information). If the device lacks this information, the device may transmit a request to the mapping system 121 which responds with the information from either the geographic database 123 or server 125. In an embodiment, the information is formatted using a JSON format, for example similar to GeoJSON. The information may be formatted using a Spline JSON object that is described herein. The Spline JSON object includes at least a spline identifier and spline attributes. The device 122 uses the spline identifier and spline attributes to generate one or more geometries (points, lines, polygons) that may then be rendered and displayed to the user. The device 122 is further configured to continue to use the spline identifier and spline attributes to re-render and display information at a different scale level or zoom level to the user. In this way, the bandwidth usage between the device 122 and mapping system 121 is limited. Additionally, by computing the geometries locally, the device 122 can provide more geometries quicker thus allowing the device 122 to render and display a more accurate and smooth representation of the geographical information.

One or more of the devices 122 may also be configured to provide probe reports to the mapping system 121 while traversing a roadway network. The probe reports may be used and analyzed by the mapping system 121 to generate geographical information that is stored in the geographic database 123. For example, the one or more devices 122 may collect data about the shape of a roadway. The shape is stored in the geographic database 123 and analyzed by the mapping system 121 in order to identify or select a spline function that represents the portion of the roadway. Each vehicle and/or mobile device 122 may include position circuitry such as one or more processors or circuits for generating probe data. The probe data may be generated by receiving Global Navigation Satellite System (GNSS) signals and comparing the GNSS signals to a clock to determine the absolute or relative position of the vehicle and/or mobile device 122. The probe data may be generated using embedded sensors or other data relating to the environment of a vehicle or device 122. The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). The probe data may also describe the speed, or velocity, of the mobile device 122. The speed may be determined from the changes of position over a time span calculated from the difference in respective timestamps. The time span may be the predetermined time interval, that is, sequential probe data may be used. In some examples, the probe data is collected in response to movement by the device 122 (i.e., the probe report's location information when the device 122 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user. The one or more devices 122 may also be configured to acquire image data using one or more cameras embedded in or in communication with the one or more devices 122. The image data may be transmitted to the mapping system 121 for storage in the geographic database 123 and processing by the server 125. The image data may include metadata, for example, attributes about an image, such as its height and width, in pixels. The metadata may describe the content of the image, the date and time of the image, etc.

To communicate with the devices 122, systems or services, the mapping system 121 is connected to the network 127. The mapping system 121 may receive or transmit data through the network 127, such as, for example Spline JSON data for use by a device 122. The mapping system 121 may also transmit paths, routes, or traffic violation data through the network 127. The mapping system 121 may also be connected to an OEM cloud that may be used to provide mapping services to vehicles via the OEM cloud or directly by the mapping system 121 through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 may use Vehicle-to-vehicle (V2V) communication to wirelessly exchange information about their speed, location, heading, and roadway conditions with other vehicles, devices 122, or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular ad-hoc Network (VANET).

The probe data/reports, Spline data, spline data object, and other data may be stored in the geographic database 123. The geographic database 123 is configured to store and provide information to and from at least the mapping system 121, server 125, and devices 122. The geographic database 123 may store spline functions, attributes, and respective identifiers for road segments, locations, strands, or links. The geographic database 123 may include one or more indexes of geographic data. The indexes may include various types of indexes that relate the different types of data to each other or that relate to other aspects of the data contained in the geographic database 123. The indexes may include, for example, data relating to points of interest or roadway features. The point of interest data may include point of interest records including, for example, a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The geographic database 123 provides data for the traffic violation model. The map data may include road types, road layouts, lane features, traffic lights/stop signs, etc. The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway.

The data from the geographic database 123 may be analyzed and/or processed by the mapping system 121, for example by the server 125, in order to provide mapping services. The mapping system 121 may use data from the geographic database 123 to determine which spline functions and spline attributes are appropriate for associated geographic features. The mapping system 121 may include multiple servers 125, workstations, databases, and other machines connected together and maintained by a map developer. The mapping system 121 may be configured to acquire and process data relating to roadway or vehicle conditions. For example, the mapping system 121 may receive and input data such as vehicle data, user data, weather data, road condition data, road works data, traffic feeds, etc. The data may be historical, real-time, or predictive. The data may be stored in an HD map, in a location graph, or in the geographic database 123 for use in location-based services and navigation-based services. The mapping service may also provide information included in the database 123.

The server(s) 125 may be a host for a website or web service such as a mapping service and/or a navigation service. The mapping service may provide standard maps or HD maps generated from the geographic data of the database 123, and the navigation service may generate routing or other directions from the geographic data of the database 123. The mapping service may provide Spline JSON data object included in the database 123 that relates to one or more geographic features. The server 125 may also provide historical, future, recent or current traffic conditions for the links, segments, paths, or routes using historical, recent, or real-time collected data. The server 125 is configured to communicate with the devices 122 through the network 127. The server 125 is configured to receive a request from a device 122 for a route or maneuver instructions and generate one or more potential routes or instructions using data stored in the geographic database 123. The routing data may be provided using Spline JSON data object. The server 125 may also be configured to provide up to date information and maps to external geographic databases or mapping applications, for example formatted using the Spline JSON format as described herein.

In an embodiment, the server 125 is configured to analyze data stored in the geographic database 123, determine a spline function and spline attributes that are appropriated for respective geographic features, and store the spline function and spline attributes in the geographic database 123. The server 125 is configured to receive a request for a geographic feature or geographic information and provide the information, using, when possible, the Spline JSON format including the spline function and spline attributes. Certain data may also be provided using the GeoJSON format. A straight line or point, for example, may be best approximated by the GeoJSON format and not a Spline JSON object. Different features may be represented by Spline JSON objects, including but not limited to roadways, terrain features, points of interest, routing instructions, etc. The use of the Spline JSON objects allows the device 122 to have more control over the number of geometries used and allows for more efficient transmission between the mapping system 121 and device 122.

Figure 4:
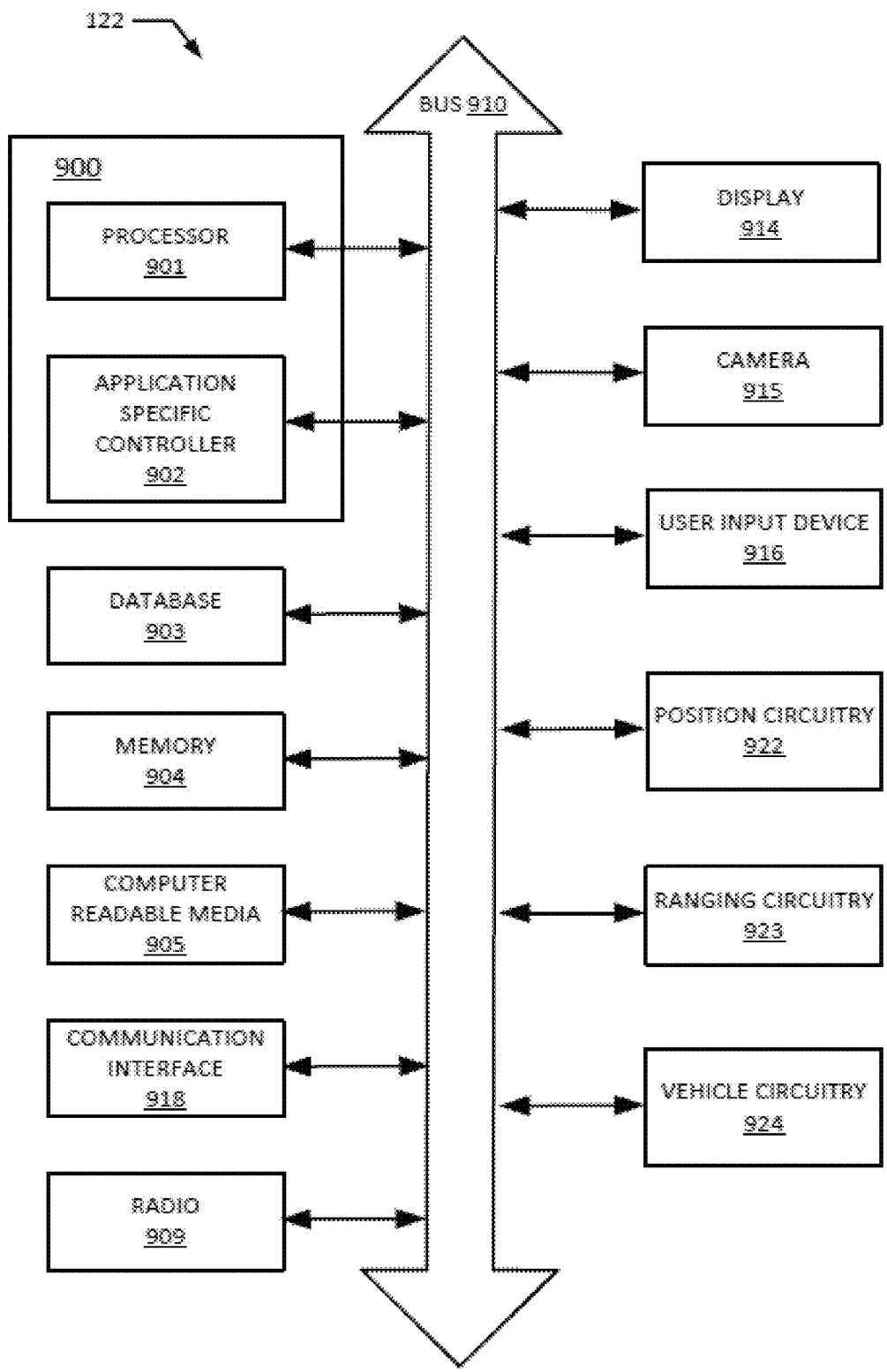
FIG. 4 depicts an example device of FIG. 3 according to an embodiment.

FIG. 4 illustrates an example mobile device 122 for the system of FIG. 3 that computes geometries locally for geographical features and renders and display the geometries. The mobile device 122 may include a bus 910 that facilitates communication between a controller 900 that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to the geographic database 123. The device-side database 903 may be a user database that receives data in portions from the database 903 of the mobile device 122. The communication interface 918 connected to the internet and/or other networks (e.g., network 127 shown in FIG. 3). The vehicle circuitry 924 may include any of the circuitry and/or devices described with respect to FIG. 4. Additional, different, or fewer components may be included.

Figure 5:
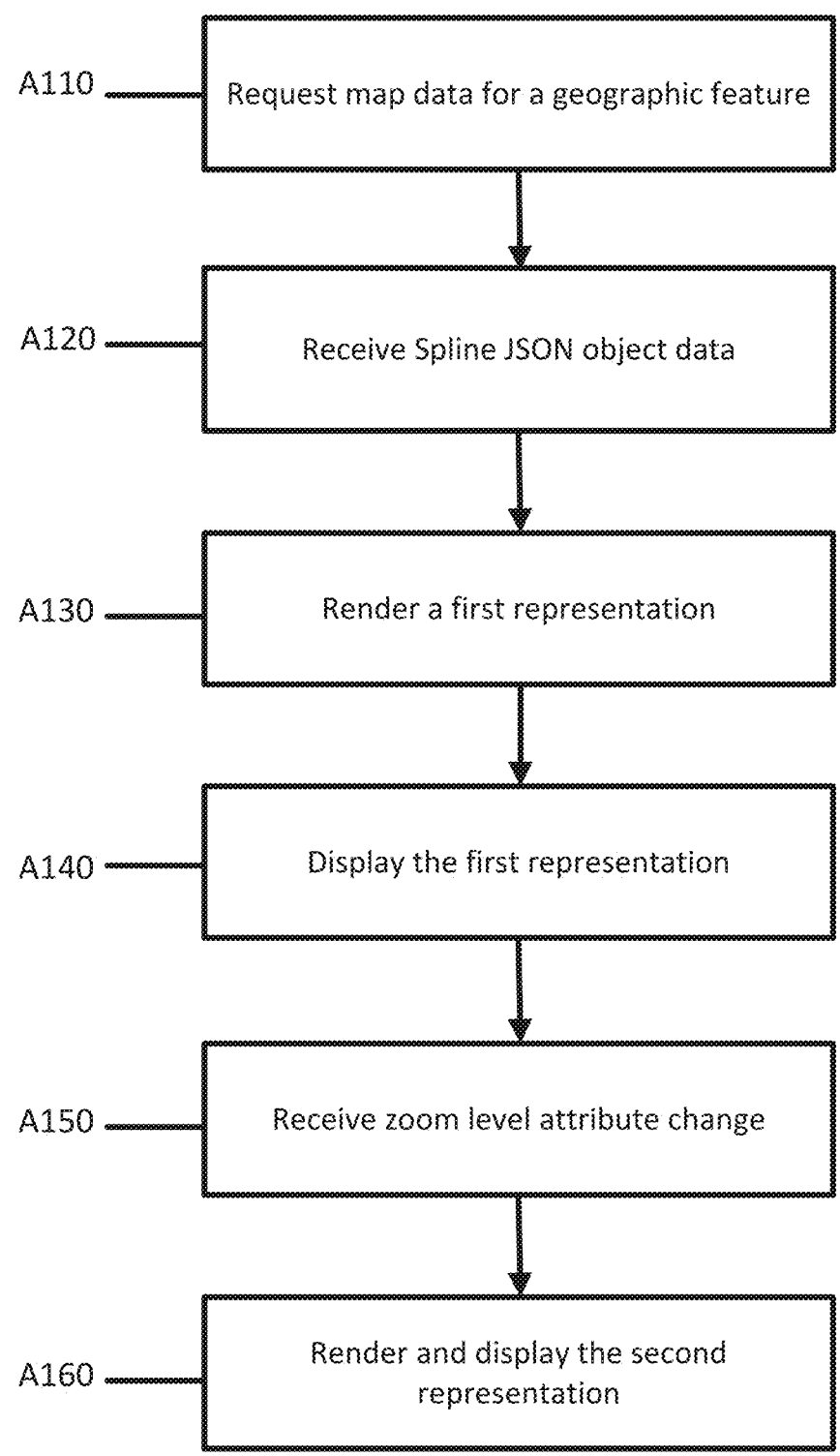
FIG. 5 depicts an example workflow for applying a Spline JSON object according to an embodiment.

FIG. 5 depicts an example workflow for using a Spline JSON object when displaying geographic features using the device 122 of FIG. 3. As presented in the following sections, the acts may also in part be performed using any combination of the components indicated in FIG. 3, FIG. 4, or FIG. 9. For example, certain acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, the device requests map data for a geographic feature. The device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The map data may relate to a geographic feature such as signage data, lane data, traffic signal data, physical and painted features like dividers, lane divider markings, road edges, center of intersection, stop bars, overpasses, overhead bridges, etc. The map data may relate to points of interest such as a restaurant, fuel station, hotel, city hall, police station, historical marker, ATM, golf course, truck stop, vehicle chain-up stations, etc. The map data includes at least a locational component. In an embodiment, the map data relates to the roadway network and describes or represents the shape or construction of the roads. In an embodiment, the map data relates to a routing request by the device 122 for example that describes a route from a current location of the device to a destination. The routing data may be requested so that the device 122 may display the route to a user of the device 122. The device 122 is configured to determine its location using the position circuitry 922, ranging circuitry 923, vehicle circuitry 924, and the geographic database 123. The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122. The position circuitry 922 may also include gyroscopes, accelerometers, magnetometers, or any other device for tracking or determining movement of a mobile device 122. The gyroscope is operable to detect, recognize, or measure the current orientation, or changes in orientation, of a mobile device 122. Gyroscope orientation change detection may operate as a measure of yaw, pitch, or roll of the mobile device 122.

The device 122 may communicate with the server 125 using the communication interface 918 which may include any operable connection. An operable connection may be one in which signals, physical communications, and/or logical communications may be sent and/or received. An operable connection may include a physical interface, an electrical interface, and/or a data interface. The communication interface 918 provides for wireless and/or wired communications in any now known or later developed format. The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

At act A120, the device receives from the mapping system 121, one or more spline identifiers and spline attributes related to the geographic feature. The one or more spline identifiers and spline attributes may be included in a Spline JSON object. One possible format for the Spline JSON object is described below:

```
Spline-JSON
  {ID: XXXX
   Spline: {
     Knot_Vector {XXXX}
     Junction_Definition {XXXX}
     Confidence_Value {XXXX}
     }
  }
```

In an embodiment, the spline functions are stored in a spline function pool that includes a plurality of spline functions that may be applied by the device by implementing the spline attributes received from the server 125. The spline functions are identified by the spline identifier (ID: XXXX in the Spline JSON object shown above). The use of a spine function pool cuts down on the amount of data that needs to be included in the Spline JSON format as the actual function does not need to be included, only a pointer or identifier. In addition, there are fixed patterns in certain regions that allow the spline functions to be reused for multiple geographical features. In an example, in a region there may be five different types of roundabouts that, for example, have slightly different shapes or sizes. Instead of computing functions for each individual roundabout, the mapping system 121 may provide five templates or identifiers that describe splines for each of the five different types of roundabouts. The five different spline functions may be stored in a spline pool for an area or region. The device 122 can access the pool by downloading the entire pool or making requests, for example, to the mapping system 121. The spline pool, may for example, be stored in the memory of the device 122. The memory 904 may be a volatile memory or a non-volatile memory. The memory 904 may include one or more of a read only memory (ROM), random access memory (RAM), a flash memory, an electronic erasable program read only memory (EEPROM), or other type of memory. The memory 904 may be removable from the mobile device 122, such as a secure digital (SD) memory card.

The spline function may include any type of spline function. In an embodiment, the Spline functions are B-Spline Functions. A B-spline function is a combination of flexible bands that is controlled by a number of points that are called control points, creating smooth curves. These functions enable the creation and management of complex shapes and surfaces using a number of points. In particular, the spline function may be a NURBS or Non-Uniform Rational B-Spline. NURBS are mathematical representations of 3D geometry that are used to describe any shape from a simple two-dimensional line, circle, arc, or curve to the most complex three-dimensional organic free-form surface or solid. Four things define the NURBS curve: degree, control points, knots, and an evaluation rule. The degree is a positive whole number. This number is usually 1, 2, 3, or 5, but can be any positive whole number. NURBS lines and polylines are usually degree 1, NURBS circles are degree 2, and most free-form curves are degree 3 or 5. The terms linear, quadratic, cubic, and quintic functions may be used to describe the degrees. Linear means degree 1, quadratic means degree 2, cubic means degree 3, and quintic means degree 5.

The control points are a list of at least degree+1 points. The shape of the NURBS curve may be changed by moving the control points. The control points have an associated number called a weight. With a few exceptions, weights are positive numbers. When a curve's control points all have the same weight (for example 1), the curve is called non-rational. Otherwise, the curve is called rational. The R in NURBS stands for rational and indicates that a NURBS curve has the possibility of being rational. In practice, most NURBS curves are non-rational. A few NURBS curves, circles, and ellipses being notable examples, are always rational.

The knots are a list of (degree+N−1) numbers, where N is the number of control points. In the Spline JSON described above, this list of numbers is referred to as the knot vector. The list of knot numbers must satisfy several technical conditions. The standard way to ensure that the technical conditions are satisfied is to require the numbers to stay the same or get larger as you go down the list and to limit the number of duplicate values to no more than the degree. For example, for a degree 3 NURBS curve with 11 control points, the list of numbers 0, 0, 0, 1, 2, 2, 2, 3, 7, 7, 9, 9, 9 is a satisfactory list of knots. The list 0, 0, 0, 1, 2, 2, 2, 2, 7, 7, 9, 9, 9 is unacceptable because there are four 2s and four is larger than the degree.

The number of times a knot value is duplicated is referred to as the knot's multiplicity. In the previous example of a satisfactory list of knots, the knot value 0 has multiplicity three, the knot value 1 has multiplicity one, the knot value 2 has multiplicity three, the knot value 3 has multiplicity one, the knot value 7 has multiplicity two, and the knot value 9 has multiplicity three. A knot value is a full-multiplicity knot if it is duplicated degree many times. In the example, the knot values 0, 2, and 9 have full multiplicity. A knot value that appears only once is called a simple knot. In the example, the knot values 1 and 3 are simple knots. If a list of knots starts with a full multiplicity knot, is followed by simple knots, terminates with a full multiplicity knot, and the values are equally spaced, then the knots are called uniform. For example, if a degree 3 NURBS curve with 7 control points has knots 0, 0, 0, 1, 2, 3, 4, 4, 4, then the curve has uniform knots. The knots 0, 0, 0, 1, 2, 5, 6, 6, 6 are not uniform. Knots that are not uniform are called non-uniform. The N and U in NURBS stand for non-uniform and indicate that the knots in a NURBS curve are permitted to be non-uniform.

Duplicate knot values in the middle of the knot list make the NURBS curve less smooth. At the extreme, a full multiplicity knot in the middle of the knot list means a place on the NURBS curve can be bent into a sharp kink. The mapping system 121 may add and remove knots and then adjust control points to make curves have smoother or kinkier shapes depending on the shape or contours of the geographic feature. Since the number of knots is equal to (N+ degree−1), where N is the number of control points, adding knots also adds control points and removing knots removes control points. Knots can be added without changing the shape of a NURBS curve. In general, removing knots will change the curve shape.

The curve evaluation rule is a mathematical formula that takes a number and assigns a point. The NURBS evaluation rule is a formula that involves the degree, control points, and knots. The number the evaluation rule starts with is called a parameter. The evaluation rule inputs a parameter and produces a point location. The degree, knots, and control points determine how the evaluation rule works.

At act A130, the device renders a view of the geographic feature using the spline data object (for example, the Spline JSON object). Rendering the view of the geographic feature may include calculating or computing one or more roadway geometries (points, lines, polygons) that match or satisfy the spline function described by the Spline JSON object and therefore the shape of the geographic feature. In an example, the Spline JSON object may provide a function where the device may input an (x) value and receive a (y) value in return. This (x,y) coordinate may then be plotted. A second (x) value may then be inputted which returns a second (y) value. This second coordinate may then be plotted. The device 122 may then connect the two coordinates to generate a line. The number of geometries (points/lines) may depend on the zoom level, for example, the number of geometries that are required to provide a smooth representation for a user. In an example, a spline may be represented by five lines and may still provide a smooth representation. In another example, a spline may require fifty lines to provide a smooth representation. The number of geometries (points, lines, polygons) required may also be determined based on the type of device and display. This number may be provided by the mapping system 121 or may be determined and stored on the device 122. The number of geometries may be changed if, for example, feedback for the respective display of the road is poor.

Figure 6A:
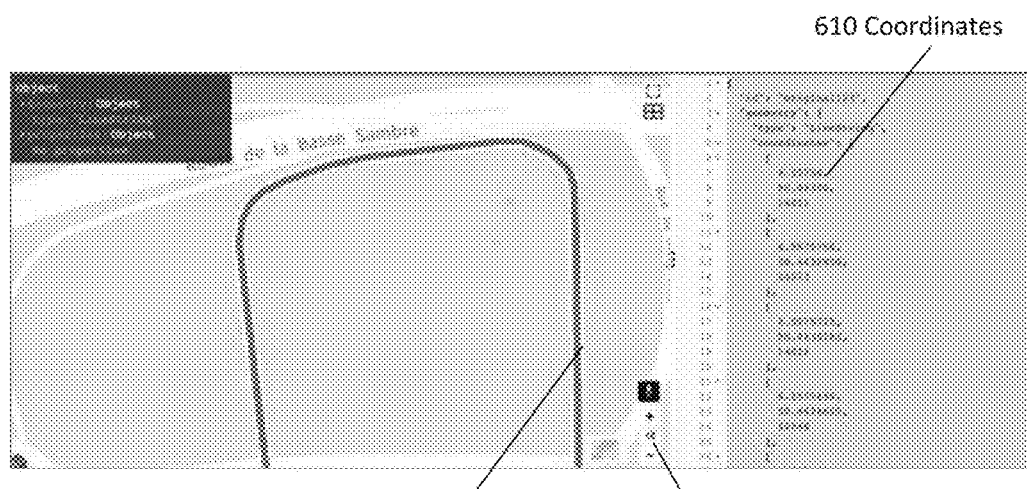
FIGS. 6A and 6B depict two representations of a geographic feature according to an embodiment.
Figure 6B:
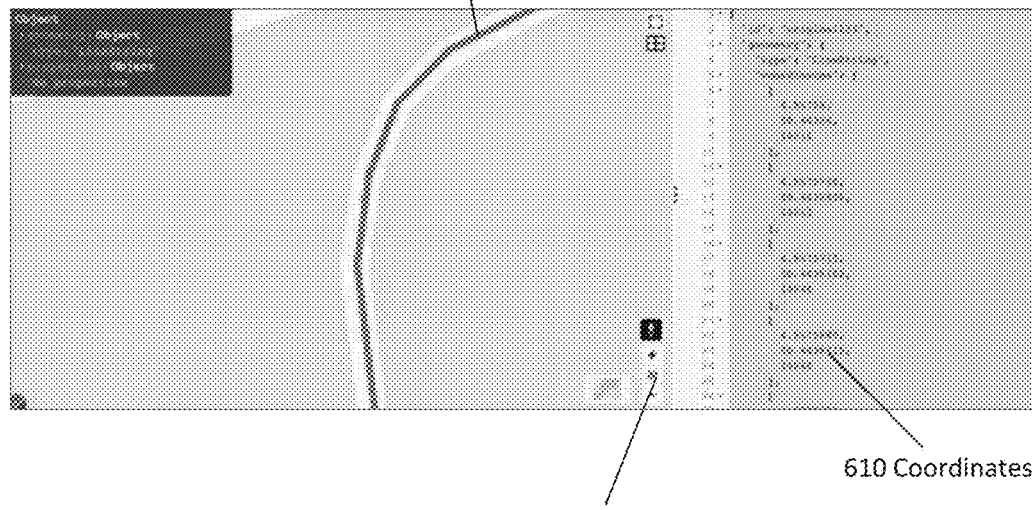

FIGS. 6A, 6B, 7A, and 7B depict examples of a rendered view of a geographic feature 612. FIGS. 6A and 6B depict a geographic feature 612 using the GeoJSON format. In order to render the geographic feature 612, the GeoJSON data includes twenty-five (25) points or coordinates 610. When setting the zoom level 614 to (18) in FIG. 6A, the kinks in the geographic feature 612 are noticeable though the depiction is still adequate. However, after increasing the zoom level 614 to (20) in FIG. 6B, the kinks are very clear. The decrease in quality is because in FIG. 6B there are fewer coordinates 610 that fit in the scaled view. For example, only five (5) of the original twenty-five coordinates 610 from FIG. 6A are used in FIG. 6B, thus decreasing the smoothness and quality of the depiction.

Figure 7A:
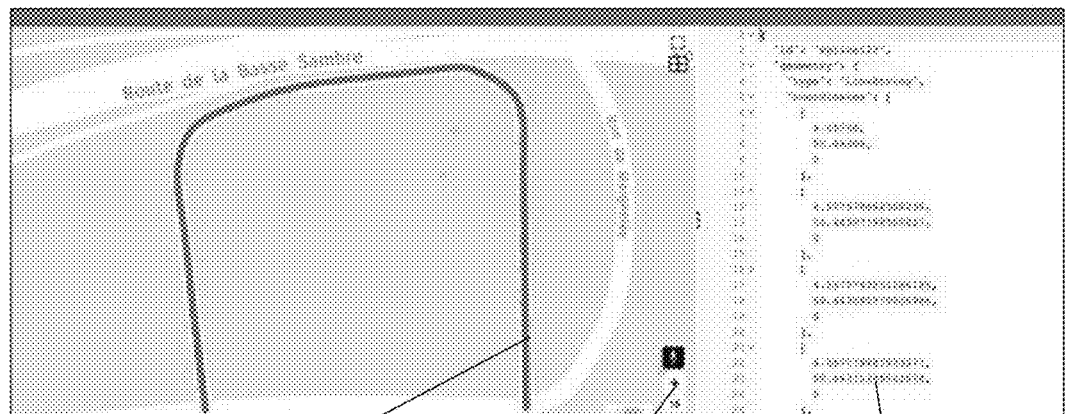
FIGS. 7A and 7B depict two representations of a scaled view of the geographic feature of FIGS. 6A and 6B according to an embodiment.
Figure 7B:
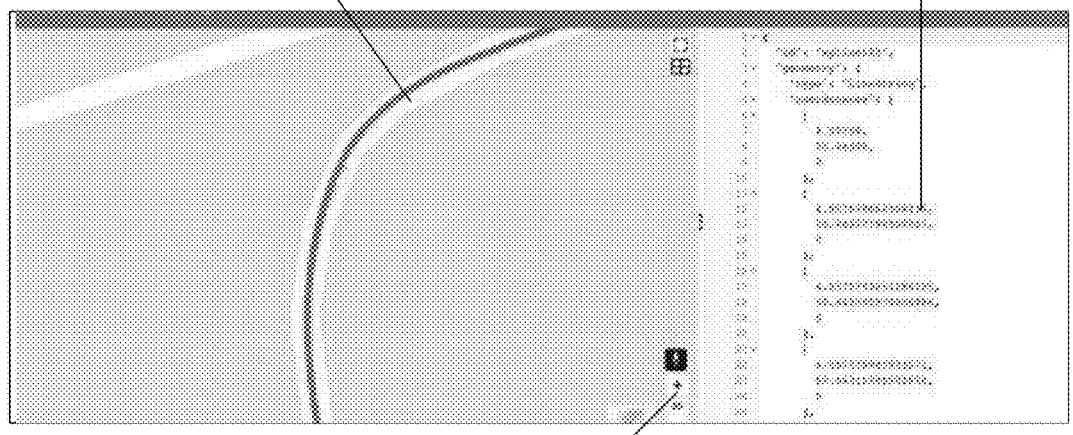

In FIGS. 7A and 7B depict the same geographic feature 612 of FIGS. 6A and 6B, but using a spline object (e.g., Spline JSON data object). The use of a spline object that includes a spline function allows the device 122 to generate as many coordinates 610 (points) as necessary to provide a smooth depiction. In FIGS. 7A and 7B, the geographic feature 612 is rendered using 229 coordinates 610. There are 229 coordinates used in both 7A and 7B although they are not the same coordinates due to the change in scale. For example, in FIG. 7B, the 229 coordinates 610 are spaced much closer to one another given that the total depicted size of the geographic feature 612 is smaller. The use of the spline function allows the device to increase the points/coordinates 610 and increase the quality at zoom levels 614 till millimeter levels or more. The locally computed coordinates 610 allows a device 122 to forgo repeated requests to the mapping system 121 and instead make its own determination in light of a designated quality level/user preferences/device capabilities/etc. If the device 122 needs ten (10) coordinates to generate a smooth depiction, the device 122 can always calculate ten (10) coordinates from the spline function regardless of a scale of a geographic feature. If the device 122 needs one hundred (100) coordinates to generate a smooth depiction, the device 122 can calculate one hundred (100) coordinates from the spline function regardless of a scale of a geographic feature.

Another benefit of calculating or computing the geometries/coordinates 610 locally is that they may be provided at a more precise level. Current GeoJSON coordinates are typically provide to five, six, or seven decimal places, e.g. (x, y)=(121.12345, 87.56789) or the coordinates 610 depicted in FIGS. 6A and 6B. The number of decimal places may be limited by limitations of the geographic database 123, the format of the data requested, or bandwidth limitations. However, when computed locally, there is no need to store (and transmit) this expansive data and thus the coordinates 610 may be computed out to, for example, ten or more decimal places as depicted in FIGS. 7A and 7B.

As described above, the Spline JSON object may include additional information such as a junction definition and a confidence value. The junction definition is used to provide better representations for where features (for example roads) meet or merge. For every road, there are two possible end points. Either the road dead ends, or it merges/connects with another road. The junction with another road may be difficult to represent using a single spline function. A junction definition may be used to model or describe the junction by provide a combination of multiple splines for the junction portion of the roadway.

Figure 8:
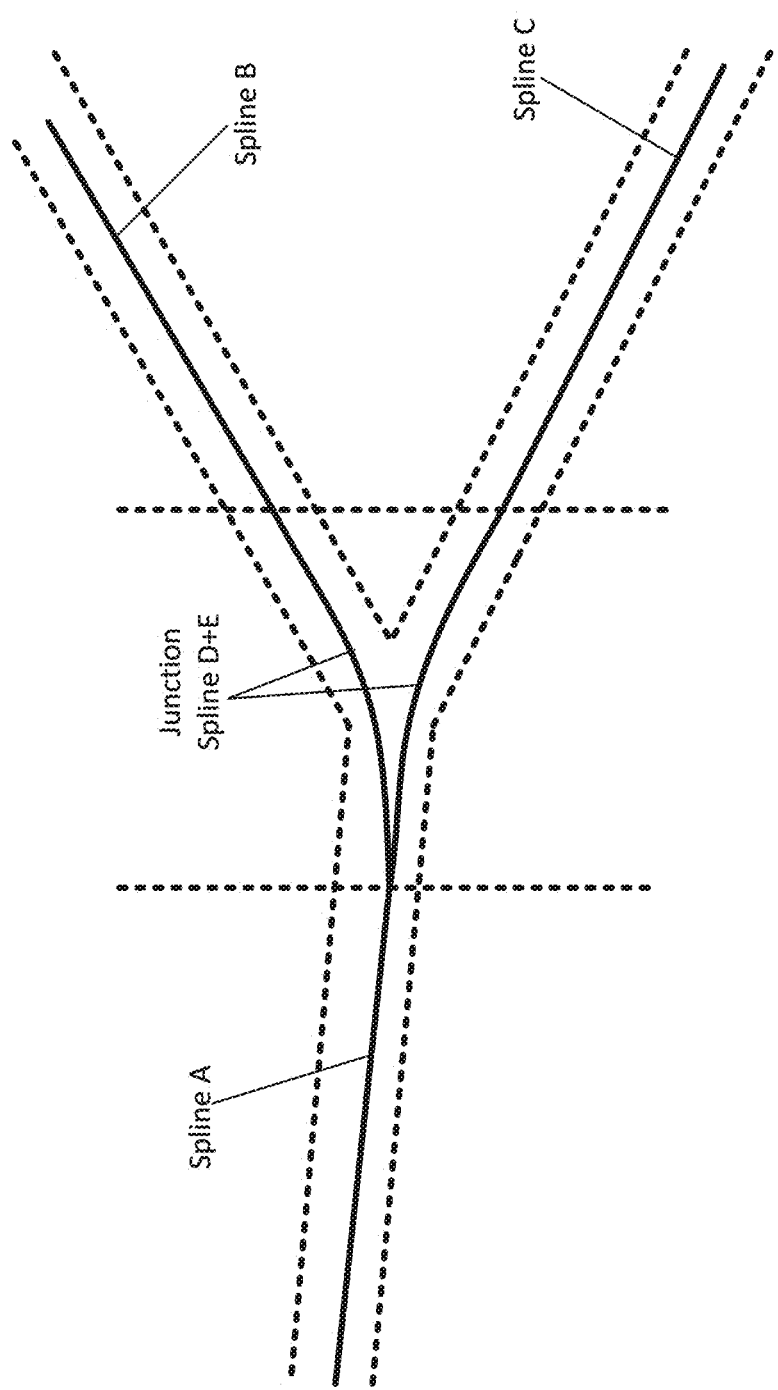
FIG. 8 depicts an example junction according to an embodiment.

FIG. 8 depicts an example of a roadway junction and how/where spline functions may be used. In FIG. 8, one road splits into two different roads. To represent the entire system, there are five separate spline functions used. There is Spline A which describes the lead up to the junction. Two functions Spline D and Spline E that describe the junction and two additional functions, Spine B and Spline C, for the portions of the roadway after the junction. The junction definition data describes how these interact and which splines are used for the junction/linking splines.

The confidence value may be used as both a feedback mechanism and an attribute that gives the device 122 further information about the spline function included with the Spline JSON object. Some geographic features are difficult to get perfectly right. For example, the shape of certain features may be too difficult to describe using spline functions. In this case and others, the mapping system 121 may provide a spline function that represents the geographic features as best as possible. In this scenario, the confidence score may indicate that the spline function is not perfect and thus may result in some errors. The confidence score may also be used as a feedback mechanism for users to identify or point out issues where the spline function does not accurately represent the geographic feature. The user plotting it on a UI should be able to provide feedback on functions. The confidence score is representative of how good the curve approximates the real world.

At act A140, the device 122 displays the first view of the geographic feature. In an embodiment, the geographic feature is a curved roadway. FIG. 7A described above depicts an example of a generated and displayed view of a road overlaid as a layer on a displayed map. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

At act A150, the device 122 receives a request to increase a zoom attribute for the displayed geographic features. A user may interact with the map/navigation system/alert using an input device 916. The input device 916 may be one or more buttons, keypad, keyboard, mouse, stylus pen, trackball, rocker switch, touch pad, voice recognition circuit, or other device or component for inputting data to the mobile device 122. The input device 916 and display 914 may be combined as a touch screen, which may be capacitive or resistive.

Mapping applications may include a varying number of zoom levels based on a location, for example 21 zoom levels as typically used. In an example of a map, at the most zoomed out (level 0) the entire map is represented by a single 256 by 256-pixel square tile. At every incremental zoom level, the map doubles in size in each direction—each tile is replaced by 4 more detailed ones (2×2) when zooming. Each tile is still only 256 by 256 pixels, and when combined together the result is the same map (only more detailed). In this example, at zoom level 0 the world map is a single tile, at zoom 1 the map is 2 tiles in each direction, at zoom 2 it is 4 tiles wide, at zoom 3 it is 8 tiles wide, and so on (doubling each time). While the total width and height doubles each level, the area goes up more rapidly (1 tile, 4 tiles, 16 tiles, 64 tiles, etc. . . . ). By the time it hits zoom level 21 the map is 2 million tiles wide and contains more than 4 trillion tiles in total. Each zoom level typically includes its own style rules to decide what information should be shown. There is little value adding road information to the world map, nor building information to the country map, etc. . . . Typically, the first few levels are pretty much just the world map. At zoom 5, the continents and landmasses are the primary features. By level 10, the city details emerge. At level 15, the streets are clearly visible. And by zoom 20, the buildings may each be rendered.

One result of changing the zoom level is that the features of the map, for example, the roads become more or less detailed. At a very low-level zoom level a slight curve in a road is not perceptible. However, once the zoom level is increased, a user may be able to distinguish that the road is not straight. The increase in the amount of curve that a user may observe means that the rendering, of for example, a route on top of the map must also be more detailed in order to provide an accurate and smooth representation of the roadway. While a straight line may provide enough detail for a local road (and thus a very simple GeoJSON feature), a more detailed collection of lines may be required when the zoom level increases. Using the Spline JSON data object, the device 122 is able to compute additional geometries on the fly without having to request additional information from the mapping system 121. As an example, the device 122 may already possesses a spline function for a shape of a geographic feature. When presented with a request to increase or decrease the zoom level, a device 122 may locally compute the additional (or fewer) geometries in order to provide an ideal map for the user.

At act A160, the device 122 renders a view of the geographic feature using the one or more spline identifiers and spline attributes, the second view comprising a scaled view of the roadway geometry. In an example, the device 122 may determine that twenty coordinates are necessary to render and display a smooth depiction of a geographic feature. When a zoom level increases, the same points may no longer be adequate as due to the increased scale, only a portion of the twenty are now in the rendered view. This can be seen in FIGS. 6A and 6B. In FIG. 6A, twenty-five (25) coordinates 610 for the geographic feature 612 are adequate to provide a relatively smooth depiction. However, when zoomed in, the view only includes five of the original twenty-five (25) coordinates 610 and thus is unable to provide a smooth depiction. This may be contrasted with FIGS. 7A and 7B. In 7A there are 229 coordinates 610. In FIG. 7B there are 229 coordinates 610. This is possible without requesting additional information from the mapping system 121. The smoothness/quality of the depiction of the geographic feature 612 is kept at the same level because the device 122 can calculate additional coordinates 610 locally and in real-time to maintain the same level of quality. In addition, as described above, the geometries/coordinates 610 may be computed to additional decimal place, providing additional precision for the representation.

As described above, the spline functions identified by the Spline JSON object may include any type of spline function. In an embodiment, the Spline functions are B-Spline Functions. In particular, the spline function may be a NURBS or Non-Uniform Rational B-Spline. The mapping system 121 and, for example, the server 125 are configured to identify, compute, or select the appropriate spline function for each geographic feature based on attributes such as a shape of the respective geographic feature.

Figure 9:
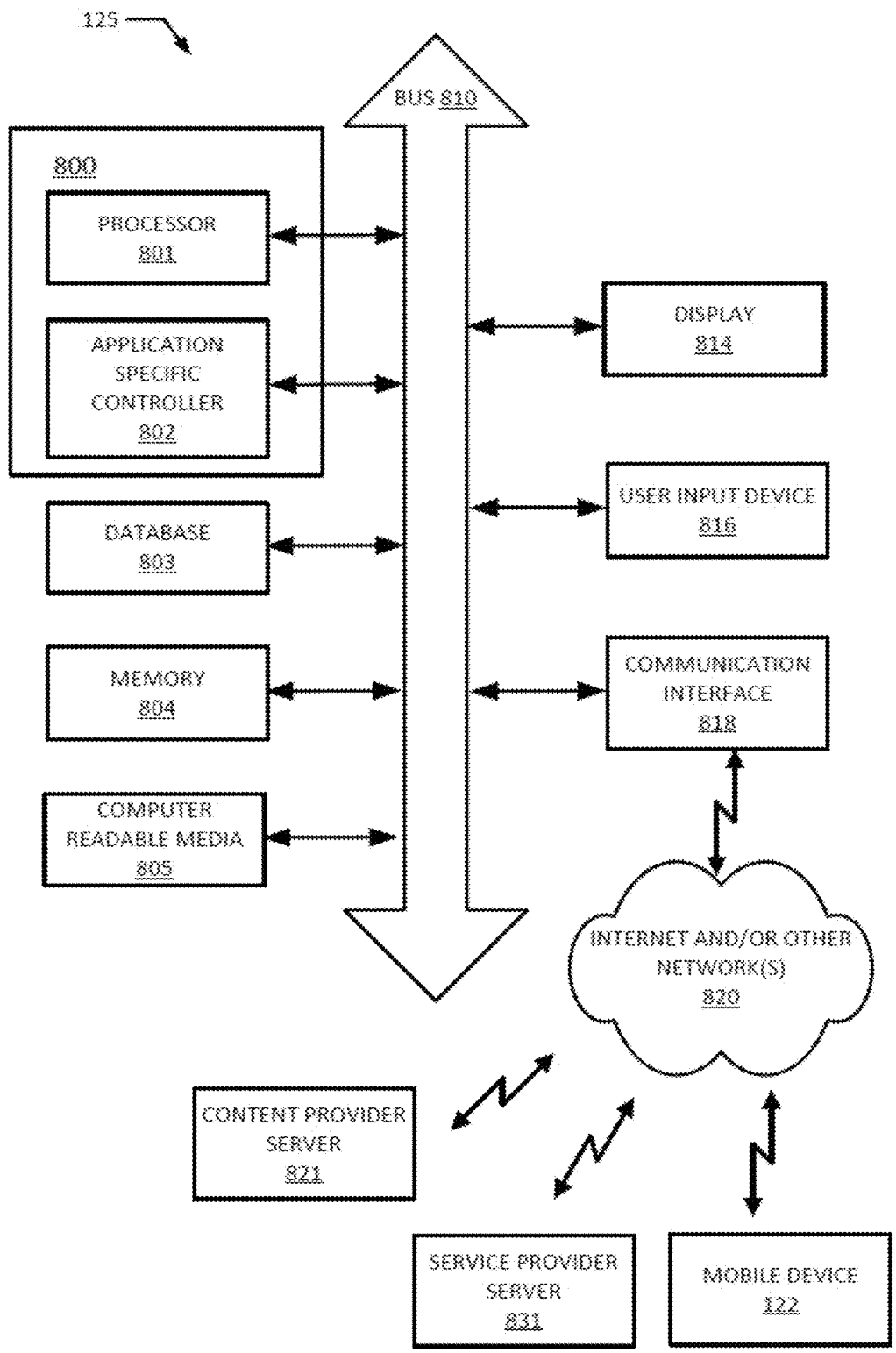
FIG. 9 depicts an example server of FIG. 3 according to an embodiment.

FIG. 9 depicts an example server 125 for the system of FIG. 3 that computes or selects a spline function for respective geographic features. The server 125 may include a bus 810 that facilitates communication between a controller 800 that may be implemented by a processor 801 and/or an application specific controller 802, which may be referred to individually or collectively as the controller 800, and one or more other components including a database 803, a memory 804, a computer readable medium 805, a display 814, a user input device 816, and a communication interface 818 connected to the internet and/or other networks 820. The contents of database 803 are described with respect to database 123. The server-side database 803 may be a master database that provides data in portions to the database of the mobile device 122. Additional, different, or fewer components may be included. The memory 804 and/or the computer readable medium 805 may include a set of instructions that can be executed to cause the server 125 to perform any one or more of the methods or computer-based functions disclosed herein. The server 125 may be in communication through the network 820 with a content provider server 821 and/or a service provider server 831. The server 125 may provide mapping or navigation related services or data to the content provider server 821 and/or the service provider server 831. The content provider may include device manufacturers that provide location-based services.

Figure 10:
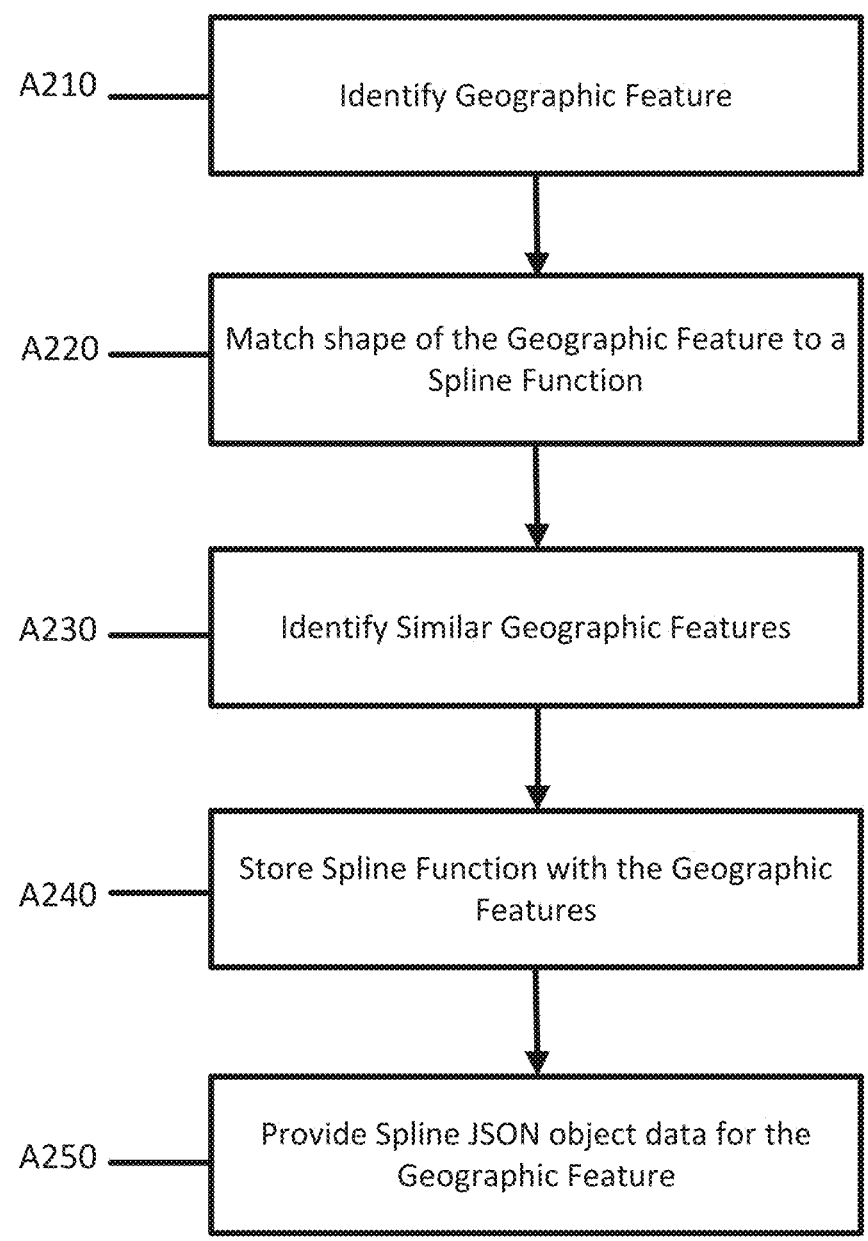
FIG. 10 depicts an example workflow for computing and storing a Spline JSON object according to an embodiment.

FIG. 10 depicts an example workflow for computing or selecting a spline function for respective geographic features using the server 125 of FIG. 3. As presented in the following sections, the acts may also in part be performed using any combination of the components indicated in FIG. 3, FIG. 4, or FIG. 9. For example, certain acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A210, the controller 800 identifies a geographic feature. The geographic feature may be or include one or more road segments. The portion may be a section of a single road segment. Road segments or portions of roads may include curves or arcs and thus may be represented by one or more spline functions. Certain features, for example points or straight lines may be represented using normal GeoJSON object data.

At act A220, the controller 800 matches a shape or contour of the geographic feature to a spline function and one or more spline attributes. The shape of the geographic feature may be represented by a single spline function. Spline functions, as described above, may include linear, quadratic, cubic, and quintic functions among other functions. In an embodiment, the spline function may be a NURBS or Non-Uniform Rational B-Spline. NURBS are mathematical representations of 3D geometry that can accurately describe any shape from a simple 2D line, circle, arc, or curve to the most complex 3D organic free-form surface or solid. Four things define a NURBS curve: degree, control points, knots, and an evaluation rule. The degree is a positive whole number. The control points are a list of at least degree+1 points. The shape of the NURBS curve may be changed by moving the control points. The knots are a list of (degree+N−1) numbers, where N is the number of control points. In the Spline JSON described above, this list of numbers is referred to as the knot vector. The curve evaluation rule is a mathematical formula that takes a number and assigns a point. The NURBS evaluation rule is a formula that involves the degree, control points, and knots. The number the evaluation rule starts with is called a parameter. The evaluation rule inputs a parameter and produces a point location. The degree, knots, and control points determine how the evaluation rule works. When applied, the spline function inputs a first value (for example, an x-coordinate) and returns a second value (for example, a y-coordinate). The number of x-coordinates used defines how smooth the curve provided by the spline function will appear to a user.

Figure 11:
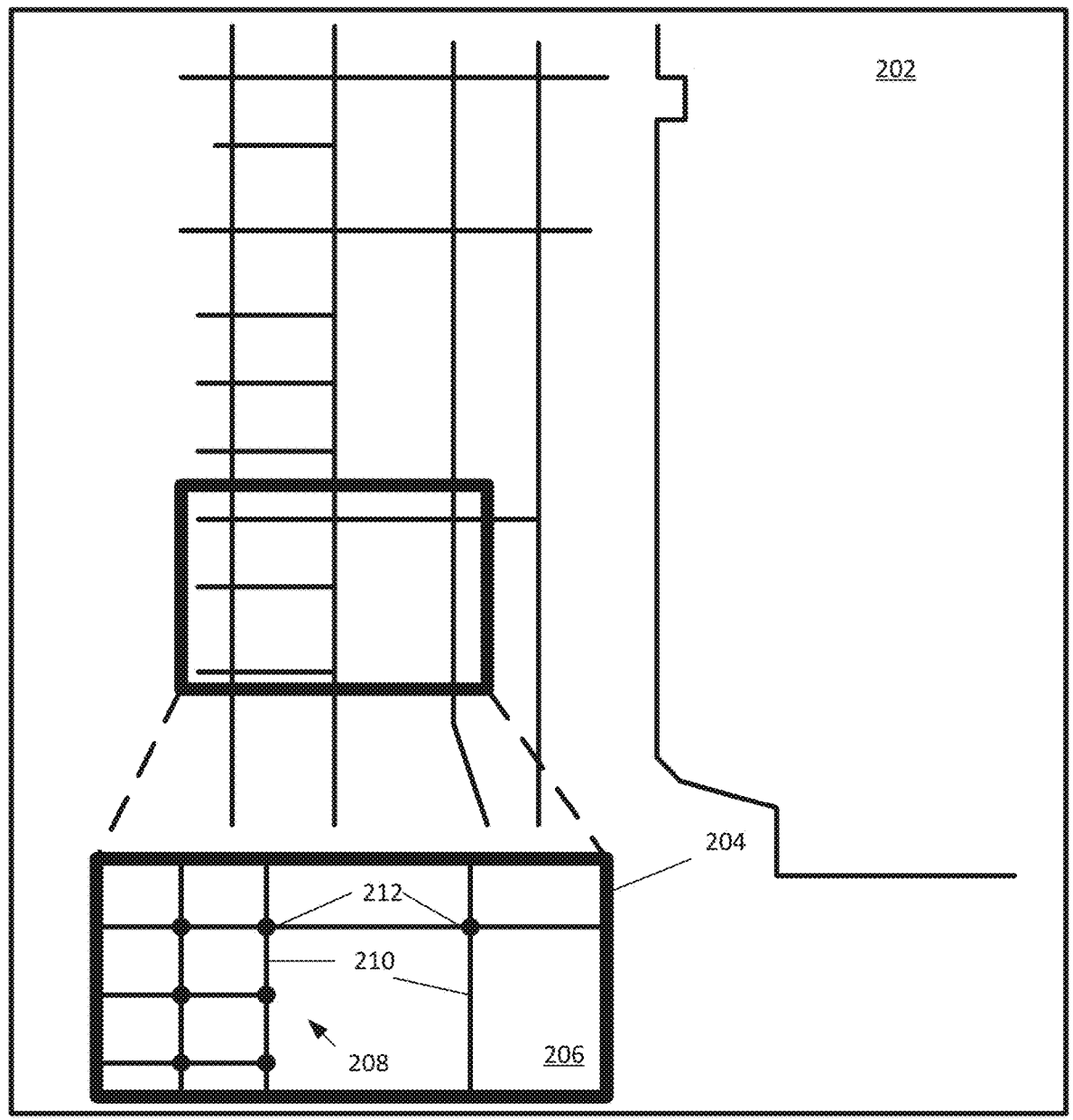
FIG. 11 depicts an example region of a geographic database.

The shape of the geographic feature may be defined based on data stored in the geographic database 123, for example, the shape of a road or angle of an arc or curve. The geographic database 123 includes information about one or more geographic regions. FIG. 11 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 11 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 12:
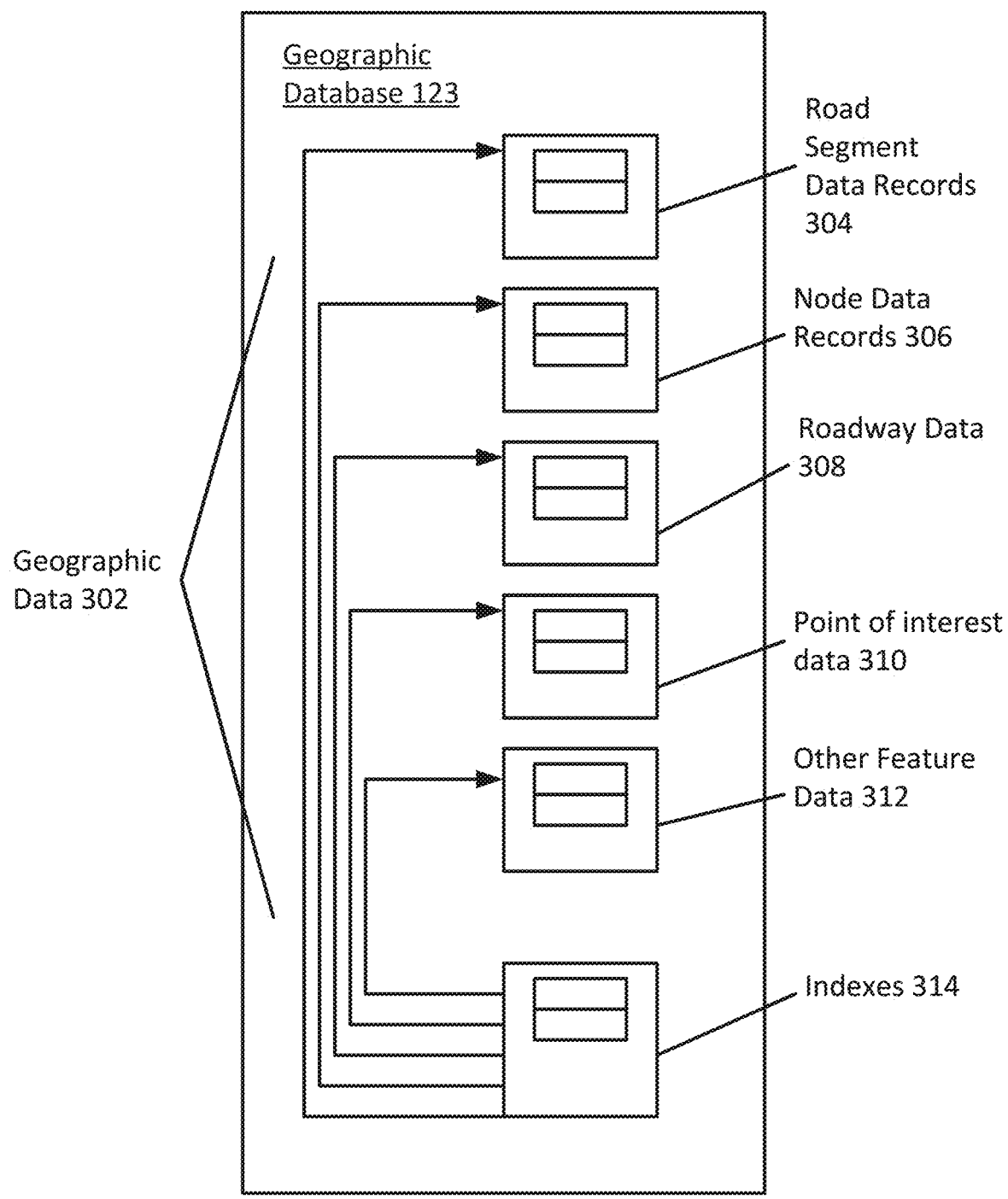
FIG. 12 depicts an example geographic database of FIG. 3.

As depicted in FIG. 12, in one embodiment, the geographic database 123 contains geographic data 302 that represents some of the geographic features in the geographic region 202 depicted in FIG. 12. The data 302 contained in the geographic database 123 may include data that represent the road network 208. In FIG. 12, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges, etc. The roadway data 308 may be further stored in sub-indices that account for different types of roads or features. The point of interest data 310 may include data or sub-indices or layers for different types of points of interest. The point of interest data may include point of interest records comprising a type (e.g., the type of point of interest, such as restaurant, fuel station, hotel, city hall, police station, historical marker, ATM, golf course, truck stop, vehicle chain-up stations, etc.), location of the point of interest, a phone number, hours of operation, etc. The feature data 312 may include other roadway features such as a spline function pool.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. The indexes may include a spline function pool that include a plurality of spline functions and identifiers that may be cross referenced with road segments or other geographic features.

Figure 13:
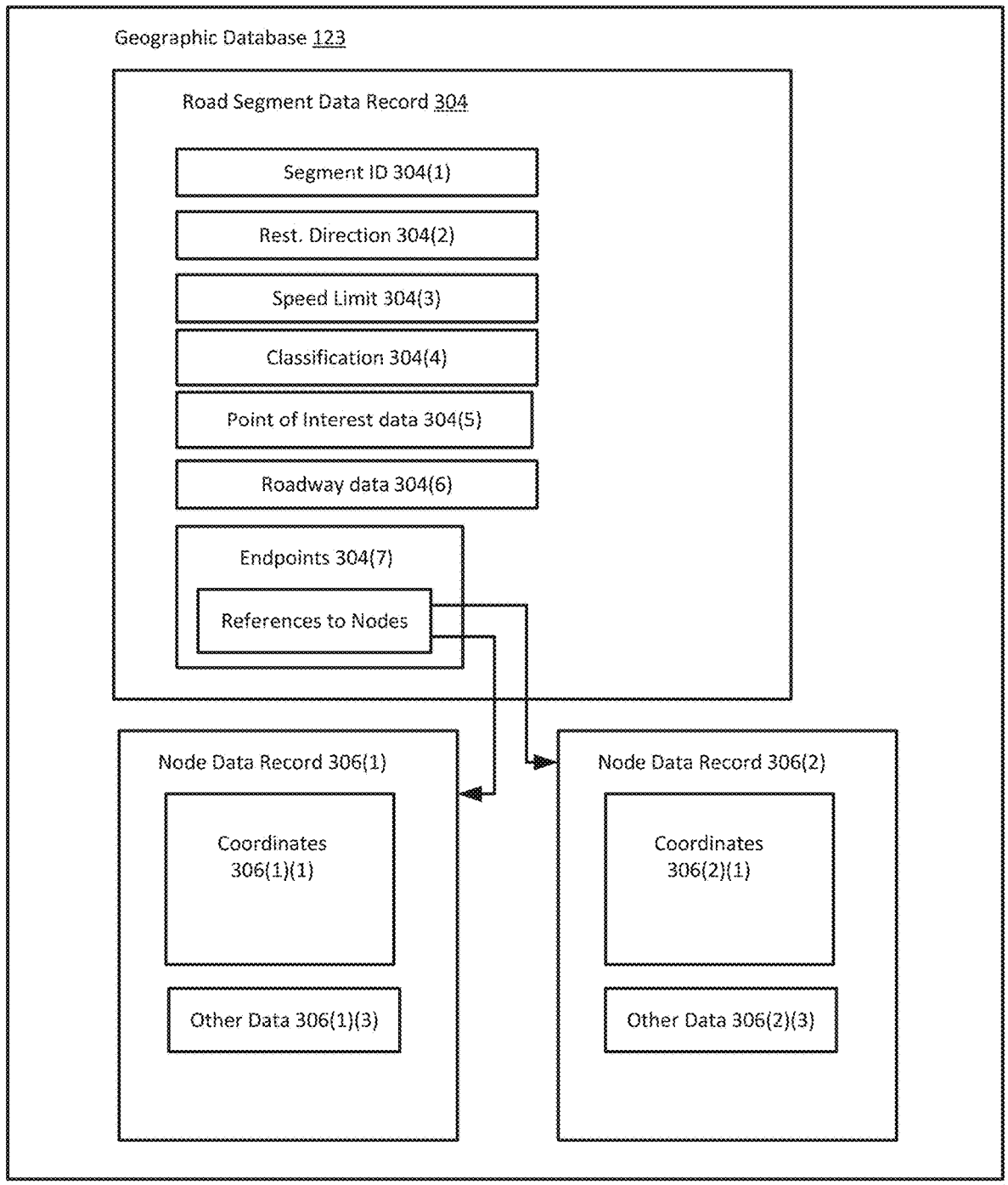
FIG. 13 depicts an example structure of the geographic database.

FIG. 13 shows some of the components of a road segment data record 304 contained in the geographic database 123 according to one embodiment. The road segment data record 304 may include a segment ID 304(1) by which the data record can be identified in the geographic database 123. Each road segment data record 304 may have associated information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to points of interest. The road segment data record 304 may include data 304(6) that describes lane configurations. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data that helps fit a spline to the road segment, a Spline identifier and attributes, POIs, signage, other parts of the road segment, etc. The various attributes associated with a road segment may be included in a single road segment record or may be included in more than one type of record which cross-references each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 13 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 13, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The data in the geographic database 123 may be organized using a graph that specifies relationships between entities. A location graph is a graph that includes relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme that defines the structure of the data. The organization of the nodes and relationships may be stored in an ontology which defines a set of concepts where the focus is on the meaning and shared understanding. These descriptions permit mapping of concepts from one domain to another. The ontology is modeled in a formal knowledge representation language which supports inferencing and is readily available from both open-source and proprietary tools.

Referring back to FIG. 10, at act A230, the controller 800 identifies a plurality of geographic features with similar shapes. Similarly shaped geographic features may be identified in the geographic database 123 by querying the geographic database 123 and attributes for certain features. Similar geographic features in a region may have similar shapes. For example, multiple roads in a region may be constructed using a similar template and thus possess a similar shape. Highways, freeways, and major streets, in particular, may be constructed using standardized regulations that describe the necessary curves and arcs of the roadway that allow for safe and efficient movement. As such, multiple different geographic features such as roads may be represented by the same spline function (with the same or similar spline attributes).

At act A240, the controller 800 stores the spline ID and the spline attributes in a geographic database 123 with the geographic features. A data object, for example a spline JSON data object, may be generated and stored with the geographic feature. Spline functions may be stored in a spline pool that is made available/published for use by navigation devices 122/applications. Alternatively, the spline functions may be made available for on-demand download by navigation devices 122/applications. The Spline ID and attributes may also be stored in the memory 804. The memory 804 may be a volatile memory or a non-volatile memory. The memory 804 may include one or more of a read only memory (ROM), random access memory (RAM), a flash memory, an electronic erasable program read only memory (EEPROM), or other type of memory. The communication interface 818 may include any operable connection or transmitter. An operable connection may be one in which signals, physical communications, and/or logical communications may be sent and/or received. An operable connection may include a physical interface, an electrical interface, and/or a data interface. The communication interface 818 provides for wireless and/or wired communications in any now known or later developed format.

At act A250, the controller 800 provides the Spline JSON data object including at least the spline ID and spline attributes in response to a request by a mapping application, for example, by the device 122 as described above in FIG. 4. The device 122 generates geometries (points, lines, polygons) locally using the associated spline function and spline attributes. Embodiments provide benefits and improvements to the runtime creation of geometries for displaying geographic features. There is no extra storage required. The locally generated geometries allow for high precision data, for example by computing coordinate decimal places further than possible in GeoJSON formats. The displayed geographic features are no longer kinky and are smoother. In addition, using the spline pools, repetition can be avoided when computing the splines allowing for easier implementation.

Figure 14:
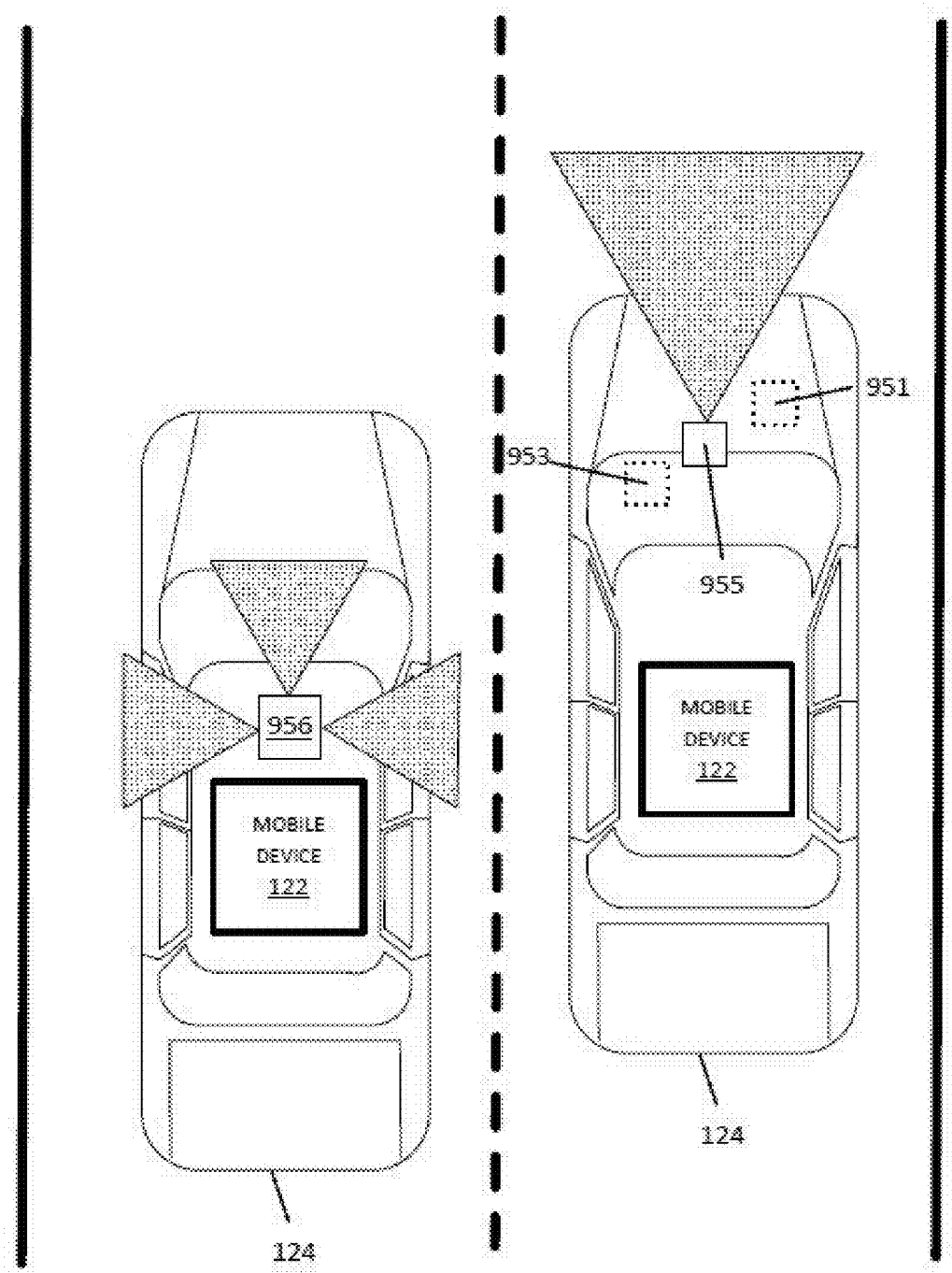
FIG. 14 depicts an example autonomous vehicle or other vehicle according to an embodiment.

In an embodiment, the device 122 may alert or otherwise provide instructions for an autonomous vehicle, highly assisted driving vehicle, or other vehicle to perform a maneuver based on the received Spline JSON data object. FIG. 14 illustrates an exemplary vehicle 124 for providing location-based services, navigation services, or applications using the systems and methods described herein as well as collecting data for such services or applications described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LIDAR device. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server 125. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) received from geographic database 123 and the server 125 and driving commands or navigation commands.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for providing a smooth map view, the method comprising:
   requesting, by a device, map data for a geographic feature;

receiving, by the device from a mapping server, one or more spline identifiers and spline attributes related to the geographic feature, wherein one or more spline functions that relate to the one or more spline identifiers are stored on at the device;

rendering, by the device, a first representation of the geographic feature by applying at least one spline function of the one or more spline functions and related spline attributes to generate a plurality of coordinates values that when connected comprise the first representation, wherein the plurality of coordinate values are generated to at least a $10^{th}$ decimal place; and displaying, by the device, the first representation.

2. The method of claim 1, further comprising:
receiving, by the device, a request to increase a zoom attribute for the geographic feature;
generating, by the device, a second representation from the one or more spline identifiers and spline attributes, the second representation comprising a zoomed in representation of the geographic feature; and
displaying, by the device, the second representation.

3. The method of claim 1, wherein the spline functions are stored in a spline pool that is specific to a region comprising at least the geographic feature.

4. The method of claim 1, wherein the spline attributes comprise at least one or more knot vectors, a junction definition, and a confidence value.

5. The method of claim 4, wherein the confidence value relates to how similar the first representation is to a real-world shape of the geographic feature.

6. The method of claim 4, wherein the junction definition comprises two or more spline functions that describe a junction of a first road and second road of the geographic feature.

7. The method of claim 1, wherein the first representation is rendered in a routing layer for presentation with a navigation application provided by the device.

8. The method of claim 1, wherein the geographic feature comprises a curved road.

9. A system for providing a smooth map view, the system comprising:
a geographic database configured to store a spline function and spline attributes for each of a plurality of geographic features; and
a navigation device configured to request data for a geographic feature of the plurality of geographic features from the geographic database and receive a respective spline object comprising at least a respective spline function identifier and respective one or more spline attributes, the navigation device further configured to generate one or more geometries using a respective spline function that corresponds to the respective spline function identifier and the respective one or more spline attributes, wherein coordinate values for the one or more geometries are generated to at least a $10^{th}$ decimal place, render a first view of the geographic feature comprising the one or more geometries, and display the rendered first view on a display of the navigation device.

10. The system of claim 9, wherein a number of the one or more geometries generated by the navigation device is dependent on a zoom level attribute for the display of the navigation device, wherein more geometries are generated as the zoom level attribute increases.

11. The system of claim 9, wherein a plurality of spline functions is stored in a spline pool, wherein the geographic database is configured to store a plurality of spline identifiers that relate to respective spine functions in the plurality of spline functions.

12. The system of claim 9, wherein the geographic database is further configured to store a confidence value for each of the plurality of geographic features, wherein the confidence value represents a user feedback defined level of accuracy of the respective spline function for the respective geographic feature.

13. The system of claim 9, wherein the geographic database is further configured to store a junction definition for geographic features that comprise a road, wherein the junction definition comprises two or more spline functions.

14. The system of claim 9, wherein the one or more spline attributes comprise at least one or more knot vectors that define a shape of a spline.

15. The system of claim 9, wherein the geographic features comprise road segments of a roadway network.

16. An apparatus comprising:
at least one processor; and
at least one memory including computer program code for one or more programs; the at least one memory configured to store the computer program code configured to, with the at least one processor, cause the at least one processor to:
request map data for a geographic feature;
receive, from a mapping server, a spline data object related to the geographic feature;
rendering a first representation of the geographic feature using the spline data object, wherein the first representation is generated from a plurality of coordinate values to at least a $10^{th}$ decimal place that are generated by a spline function specified by the spline data object; and
displaying the first representation.

17. The apparatus of claim 16, wherein the computer program code is further configured to, with the at least one processor, cause the at least one processor to:
receive a zoom attribute change request;
rendering a second representation of the geographic feature using the spline data object, wherein the second representation is reflective of the zoom attribute change request as compared to the first representation; and
displaying the second representation.

18. The apparatus of claim 16, wherein the spline data object comprises at least a spline function identifier and spline attributes.

* * * * *